US012713993B2

(12) United States Patent
Ohnsat et al.

(10) Patent No.: US 12,713,993 B2
(45) Date of Patent: Aug. 25, 2026

(54) HARROW IMPLEMENTATION

(71) Applicant: Great Plains Manufacturing, Inc., Salina, KS (US)

(72) Inventors: Michael J. Ohnsat, Tipton, KS (US); Tanner Peroutek, Tipton, KS (US); Steve Ahlvers, Glen Elder, KS (US)

(73) Assignee: Great Plains Manufacturing, Inc., Salina, KS (US)

( * ) Notice: Subject to any disclaimer, the term of this patent is extended or adjusted under 35 U.S.C. 154(b) by 415 days.

(21) Appl. No.: 18/450,753

(22) Filed: Aug. 16, 2023

(65) Prior Publication Data

US 2024/0065125 A1 Feb. 29, 2024

Related U.S. Application Data

(60) Provisional application No. 63/401,970, filed on Aug. 29, 2022.

(51) Int. Cl.
*A01B 19/08* (2006.01)

(52) U.S. Cl.
CPC .................................... *A01B 19/08* (2013.01)

(58) Field of Classification Search
CPC ......... A01B 19/08; A01B 19/02; A01B 23/00; A01B 23/02; A01B 23/043; A01B 23/046; A01B 73/044
See application file for complete search history.

(56) References Cited

U.S. PATENT DOCUMENTS

| | | | | |
|---|---|---|---|---|
| 1,008,147 A * | 11/1911 | Heylman | A01B 19/02 | 172/618 |
| 3,043,377 A * | 7/1962 | Urben | A01B 23/02 | 172/657 |
| 4,624,322 A * | 11/1986 | Lowe | A01B 19/02 | 172/639 |
| 5,443,127 A * | 8/1995 | Gates | A01B 73/048 | D15/27 |
| 10,945,362 B2 * | 3/2021 | Giudicelli | A01B 23/02 | |
| 2016/0073572 A1 * | 3/2016 | Evans | A01B 49/027 | 172/1 |

* cited by examiner

*Primary Examiner* — Joseph M Rocca
*Assistant Examiner* — Robert E Pezzuto
(74) *Attorney, Agent, or Firm* — Hovey Williams LLP; Kameron D. Kelly

(57) ABSTRACT

Linkage assemblies for harrow implements are provided that facilitate the consistent positioning of all teeth of the harrow implements in an appropriate orientation (i.e., the appropriate attack angle) during operation. Beneficially, due to the configuration of the linkage assemblies within the harrow implements, the linkage assemblies are configured to be maintained in a generally horizontal orientation during operation. As such, each of the linking elements of the linkage assemblies will have their orientations aligned, such that a horizontal plane will encompass all of the linking elements of a given harrow implement. This allows for all of the teeth of the harrow implement to be positioned at the desired and appropriate orientation.

14 Claims, 13 Drawing Sheets

51b
51b
50
50
51a
51a
48
53
48
53
48
47
53
52
12
48
53
12
14
48
52
53
47
48
53
14
52
53

HARROW IMPLEMENT

RELATED APPLICATIONS

This application claims the priority benefit under 35 U.S.C. § 119(e) of U.S. Provisional Patent Application Ser. No. 63/401,970 entitled "HARROW IMPLEMENT," filed Aug. 29, 2022, the entire disclosure of which is incorporated herein by reference.

BACKGROUND

1. Field of the Invention

The present disclosure is generally directed to agricultural harrow implements. More particularly, the present disclosure is generally directed to agricultural harrow implements with specialized linkage assemblies.

2. Description of the Related Art

Harrow implements are implements used for surface tilling of fields. For example, a harrow implement may be pulled through a field to break up large clumps of soil and/or to otherwise smooth out the surface of the soil. As such, the purpose of a harrow implement is to break up clods and to provide a soil texture that is suitable for planting seeds.

Commonly, harrow implements are comprised of rows of support bars linked together by various types of linkage assemblies. Such linkage assemblies could include simple chains, or other more complex linking elements. Nevertheless, each of the support bars will include a plurality of diamond-tipped teeth or shanks that extend in a generally downward direction. During operation of a harrow implement, the teeth will engage with the ground to break up and smooth out the soil.

Some harrow implements are configured to be pulled from either a front end or a rear end, with the teeth forming different "attack angles" (with respect to the vertical and/or the ground) depending on which end is being pulled. Unfortunately, the linkage assemblies used on prior harrow implements are not configured to maintain all of the support bars and their respective teeth in the proper orientations during operation. For instance, only the support bars and associated teeth located furthest away from the tractor may be properly oriented (e.g., the teeth further away from the tractor form proper attack angles). However, due to deficiencies in the linkage assemblies, the support bars and associated teeth located closer to the tractor will generally be incorrectly oriented (e.g., the teeth form improper attack angles).

Accordingly, further modifications and improvements are needed for linkage assemblies in harrow implements.

SUMMARY

One or more embodiments of the present disclosure generally concern a harrow implement configured to be pulled by a tractor. Generally, the harrow implement comprises: a plurality of support bars extending laterally across a width of the harrow implement, wherein the support bars are spaced apart from one another, and wherein the support bars include a plurality of teeth extending in a generally downward direction from the support bars; and a plurality of linkage assemblies connecting adjacent support bars, wherein the linkage assemblies are configured to be maintained in a generally horizontal orientation as the tractor pulls the harrow implement.

One or more embodiments of the present disclosure generally concern a method of using an agricultural harrow implement. Generally, the method comprises the steps of: (a) coupling the harrow implement to a tractor, wherein the harrow implement comprises a plurality of support bars extending laterally across a width of the harrow implement, wherein the support bars are held spaced apart from one another by a plurality of linkage assemblies connecting adjacent support bars, and wherein the support bars include a plurality of teeth extending in a generally downward direction from the support bars; and (b) pulling the harrow implement through a field, wherein during the pulling of step (b), the linkage assemblies are maintained in a generally horizontal orientation.

One or more embodiments of the present disclosure generally concern a method of using an agricultural harrow implement. Generally, the method comprises the steps of: (a) coupling the harrow implement to a tractor, wherein the harrow implement comprises a plurality of support bars extending laterally across a width of the harrow implement, wherein the support bars are held spaced apart from one another by a plurality of linkage assemblies connecting adjacent support bars, and wherein the support bars include a plurality of teeth extending in a generally downward direction from the support bars; (b) pulling the harrow implement, via the tractor, from a front end of the harrow implement, wherein during said pulling of step (b) the teeth are oriented at a first angle of attack; and (c) pulling the harrow implement, via the tractor, from a rear end of the harrow implement, wherein during said pulling of step (c) the teeth are oriented at a second angle of attack, wherein the second angle of attack is different from the first angle of attack, wherein during said pulling of steps (b) and (c), the linkage assemblies are maintained in a generally horizontal orientation.

BRIEF DESCRIPTION OF THE FIGURES

Embodiments of the present invention are described herein with reference to the following drawing figures, wherein.

DETAILED DESCRIPTION

Figure 1:
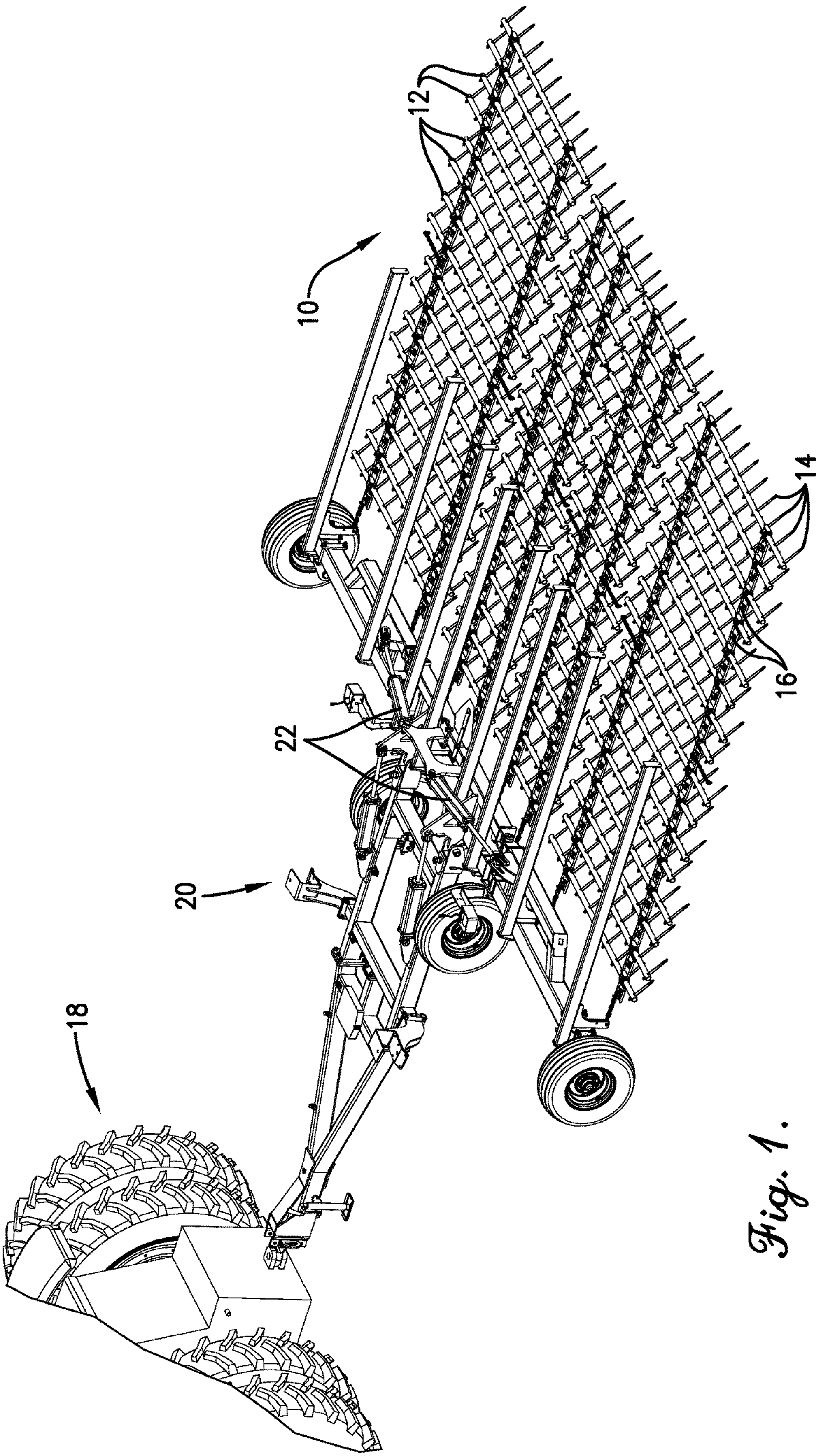
FIG. 1 depicts a harrow implement according to embodiments of the present invention being pulled by a tractor.
Figure 3:
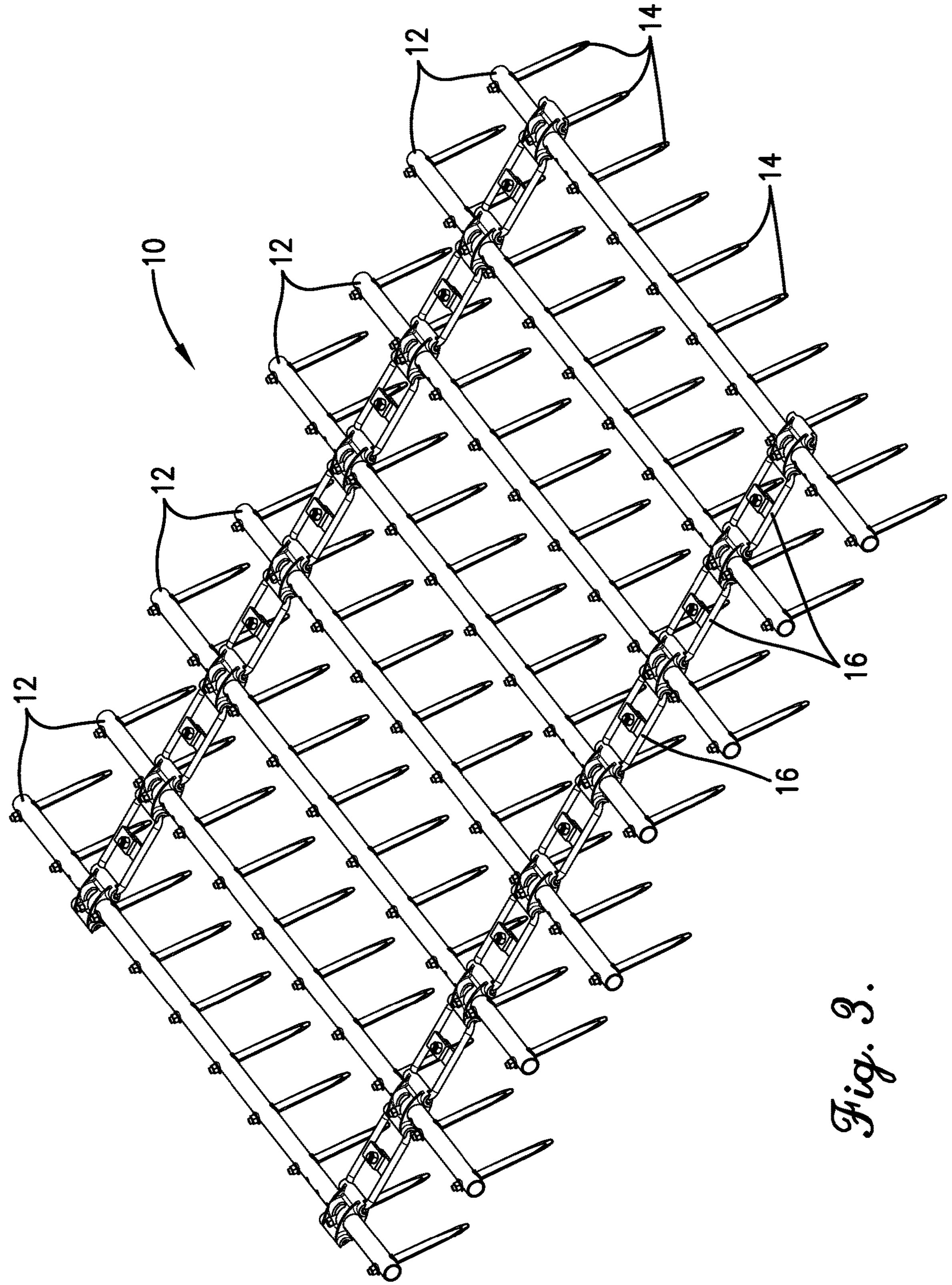
FIG. 3 provides a perspective view of a harrow implement according to various embodiments of the present disclosure.

Embodiments of the present invention are configured to address the challenges discussed above by providing, as illustrated in FIG. 1, a harrow implement configured to be pulled by a tractor. As shown in FIGS. 1 and 3, the harrow implement 10 comprises a plurality of support bars 12 extending laterally across a width of the harrow implement 10. The support bars 12 are spaced apart from one another, and each include a plurality of teeth 14 extending in a generally downward direction from the support bar 12. The harrow assembly 10 further comprises a plurality of linkage assemblies 16 connecting adjacent support bars 12. As depicted in FIG. 1, the linkage assemblies 16 are configured to be maintained in a generally horizontal orientation as the tractor 18 pulls the harrow implement 10 through a field during operation. It should be noted that although in many embodiments, the harrow implement 10 may be pulled directly behind a tractor 18, in some alternate embodiments the harrow implement 10 may be pulled behind and/or incorporated as part of another, host implement/tool (e.g., a cultivator).

In some embodiments, and as shown in FIG. 1, the harrow implement 10 may be one of a plurality of harrow implements supported on an implement frame 20 that is configured to be pulled by a tractor 18. The implement frame 20 may be configured to include two or more wing sections 22 that support the harrow implements 10, such that the harrow implements 10 can be raised in a transport position or lowered in an operating position (as shown in FIG. 1). When the harrow implements 10 are in the lowered, operating position, the teeth extend 14 in a generally downward direction from the support bars 12 to engage the soil.

Figure 2A:
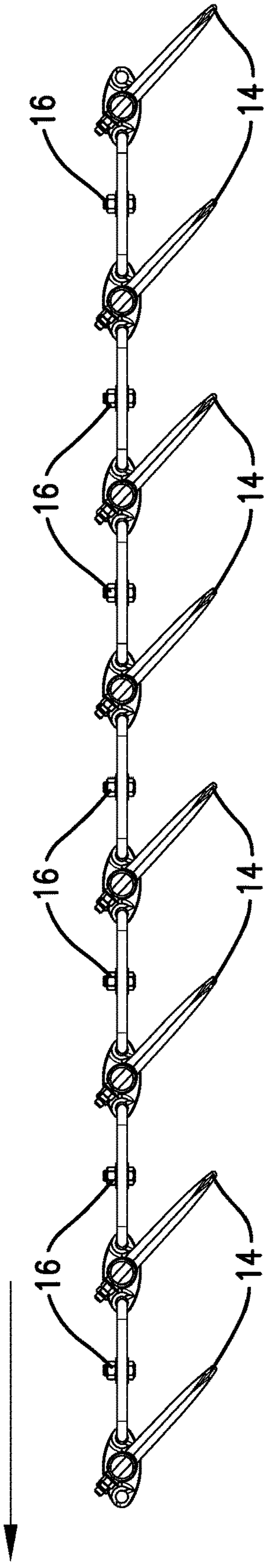
FIG. 2A depicts the shallow attack angles of the teeth of the harrow implement from FIG. 1 when pulled in one direction.
Figure 2B:
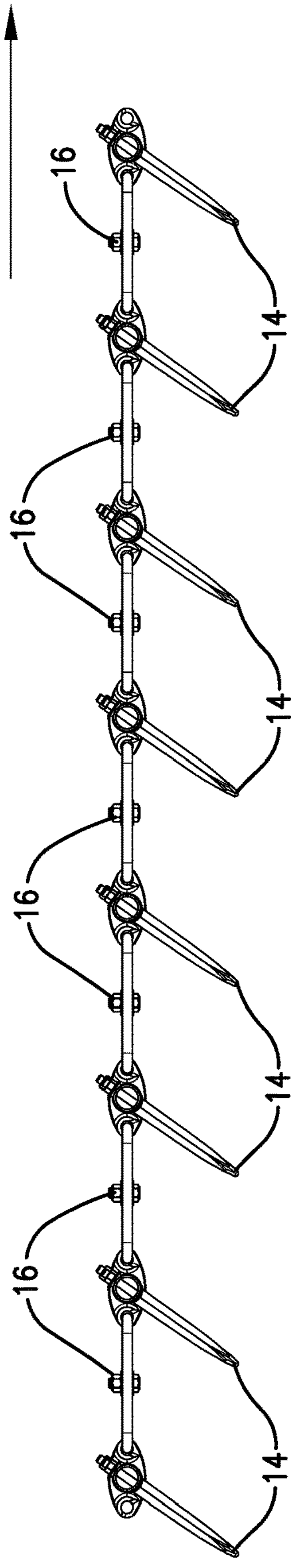
FIG. 2B depicts the steep attack angles of the teeth of the harrow implement from FIG. 1 when pulled in an opposite direction.

As shown in FIGS. 2A and 2B, the teeth may be oriented at angle with respect to the vertical, with such angle referred to as an "attack angle." The harrow implement may include a front end and a rear end, and the harrow implement may be configured such that the attack angle of the teeth is different depending on whether the harrow implement is pulled (by the tractor) from the front end or the rear end. As shown in FIG. 2A, a shallow attack angle of the teeth 14 is depicted, which is caused by when the harrow implement is pulled in a direction towards the front end. Alternatively, as shown in FIG. 2B, a steep attack angle of the teeth 14 is depicted, which is caused when the harrow implement is pulled in a direction towards the rear end.

Figure 4:
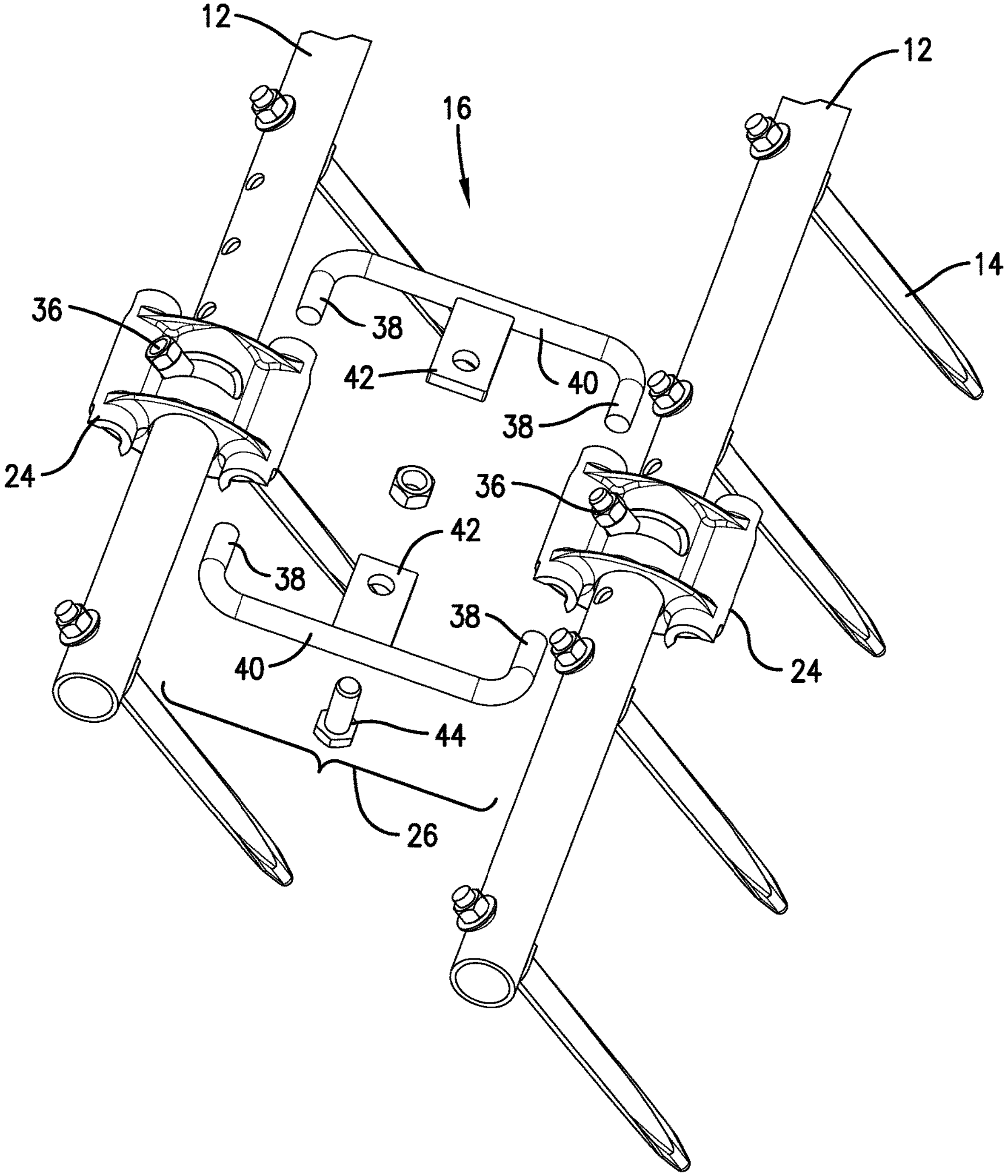
FIG. 4 provides an exploded view of a linkage assembly from the harrow implement of FIG. 3 according to various embodiments of the present disclosure.

Turning to the linkage assemblies 16 in more detail, as shown in FIG. 4, the linkage assemblies 16 may comprise a base element 24 and a linking element 26. The linking element 26 may extend from the base element 24 to another base element 24 located on an adjacent support bar 12. As illustrated, each of the base elements 24 may be associated with (i) a first linking element 26 extending in a forward direction to an adjacent support bar 12 (on which another base element 24 is supported) positioned forward of the base element 24, and (ii) a second linking element 26 extending in a rearward direction to an adjacent support bar 12 (on which another base element 24 is supported) positioned rearward of the base element 24. In such a way, each of the support bars 12 of the harrow implement can be interconnected via the plurality of linkage assemblies 16.

Figure 5A:
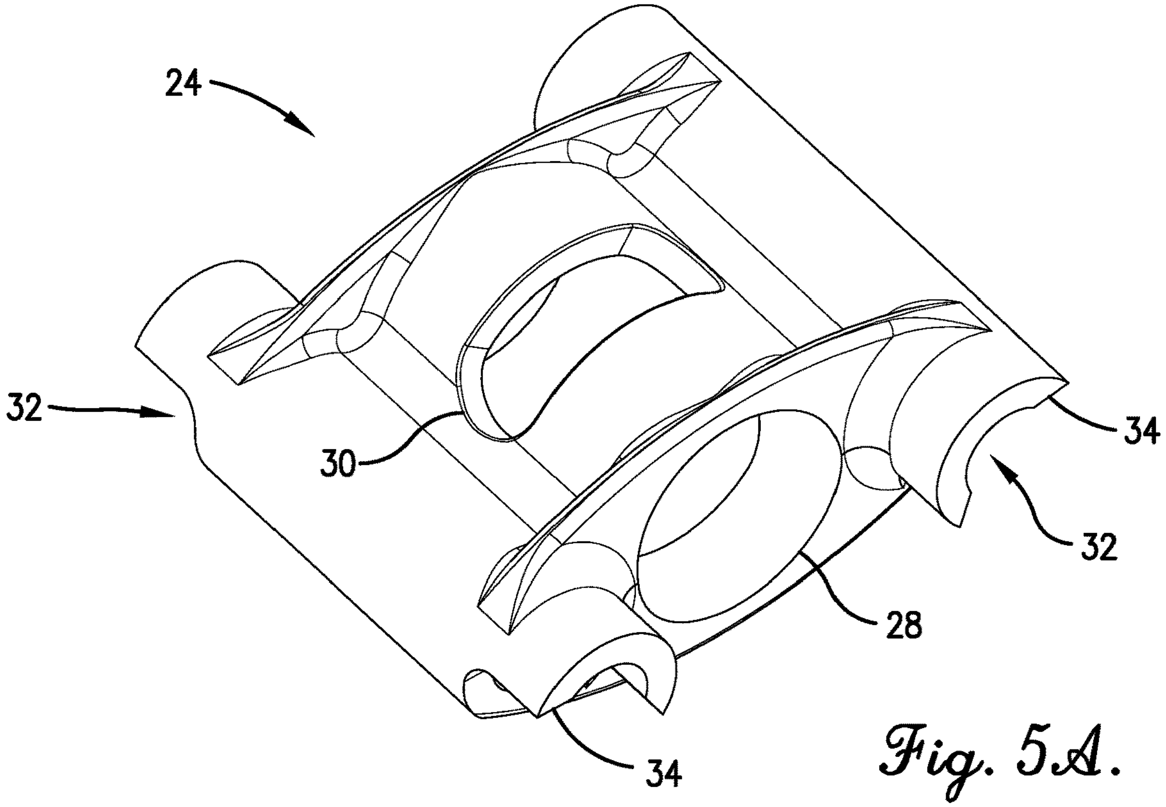
FIG. 5A provides a top view of a base element of the linkage assembly from FIG. 4 according to various embodiments of the present disclosure.
Figure 5B:
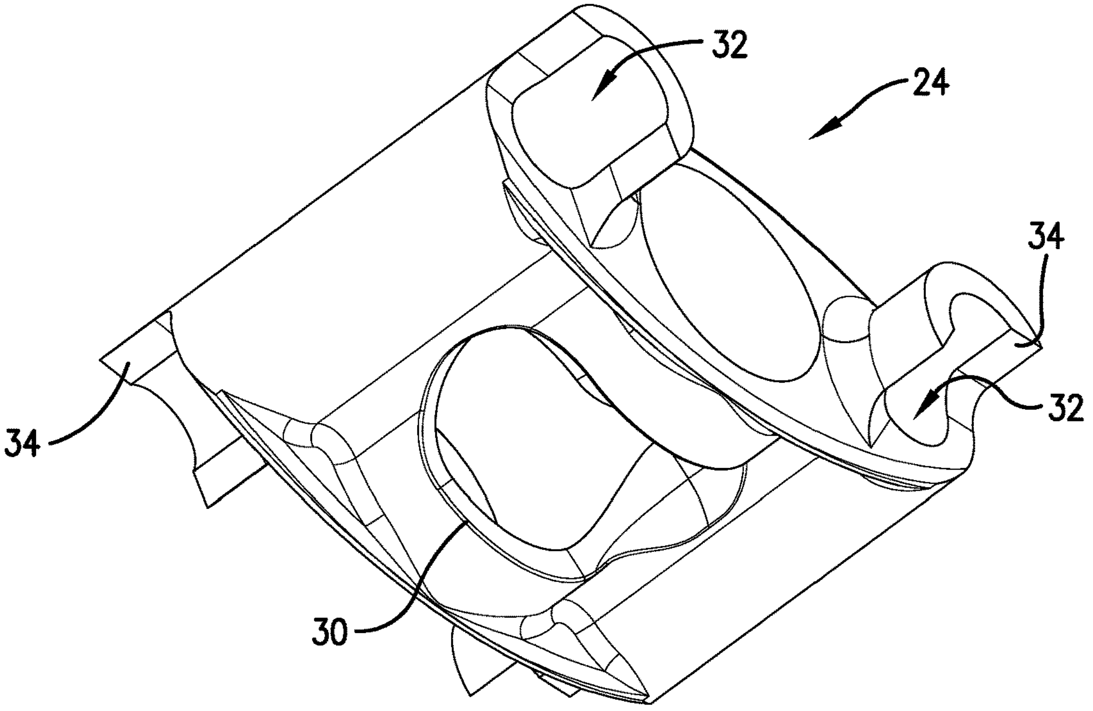
FIG. 5B provides a bottom view of the base element from FIG. 5A.

As shown in FIGS. 5A and 5B, the base element 24 may comprise a hollow central section presenting a laterally-extending through-hole 28. As used herein, the term "laterally" generally refers to a left and right direction orientation (with respect to a direction of travel of the tractor/implement), while the term "longitudinally" generally refers to a front to back direction/orientation. As such, the base element 24 can be supported on one of the support bars 12, with the support bar 12 extending through the through-hole 28 of the base element 24. Furthermore, each of the base elements 24 may comprise an upper portion having a longitudinally extending slot 30 that extends through a thickness of the upper portion of the base element 24. The slot 30 extends in a longitudinal direction (front to back) from a vertical position to a front stop and a back stop.

Furthermore, as shown in FIGS. 5A and 5B, the base element 24 may comprise a pair of receiving tubes 32 extending laterally at both forward and rearward ends of the base element 24. In some embodiments, each receiving tube 32 is formed with a notch 34 providing a stop surface for an associated linking element 26. As such, the stop surface within the notch 34 prevents the linking element 26 from rotating beyond a generally horizontal orientation during operation of the harrow implement 10.

Figure 6:
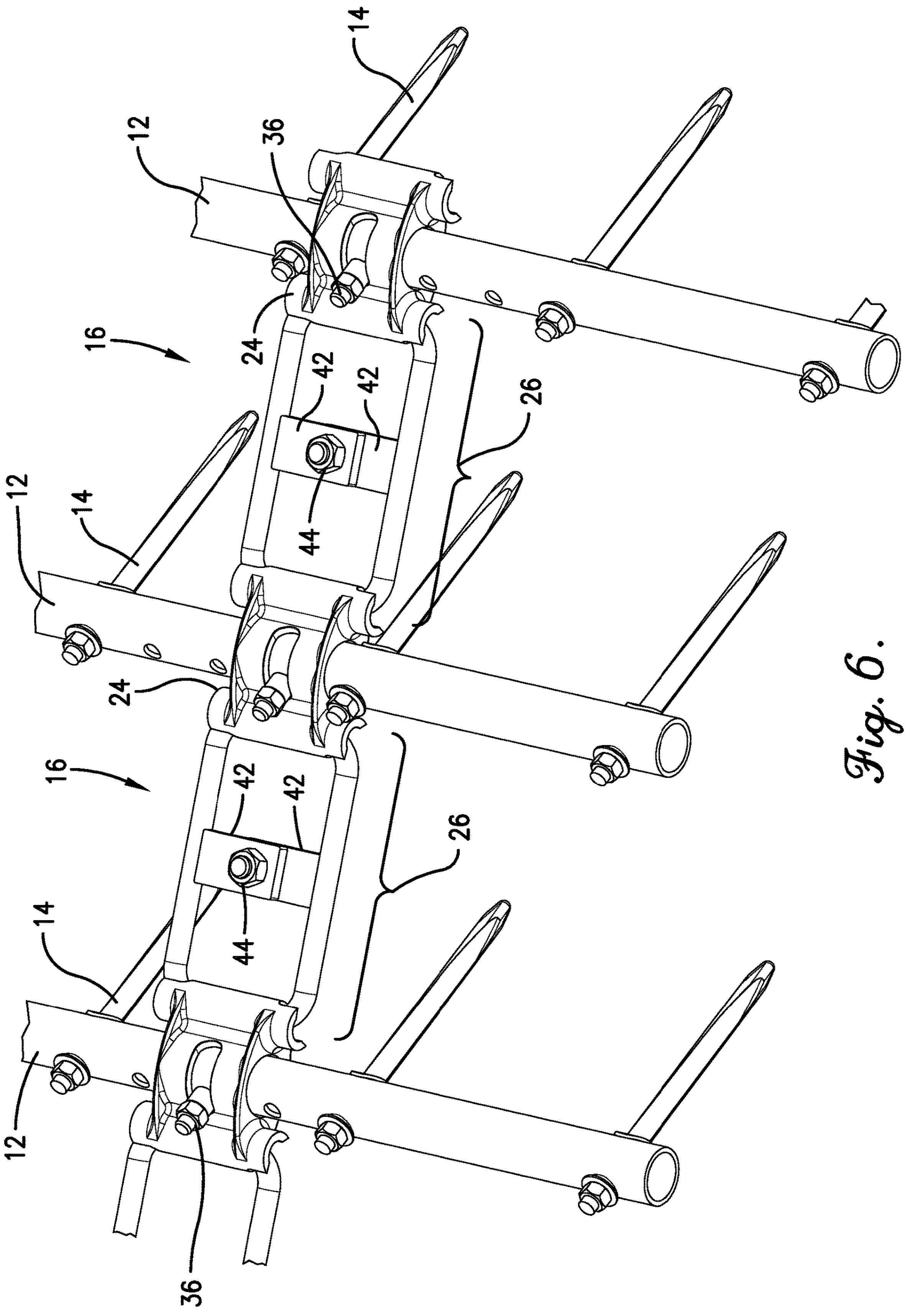
FIG. 6 provides a top view of a portion of the harrow implement from FIG. 4 with a pin of a support bar shifted forward in a notch of the base element from FIGS. 5A and 5B.
Figure 7:
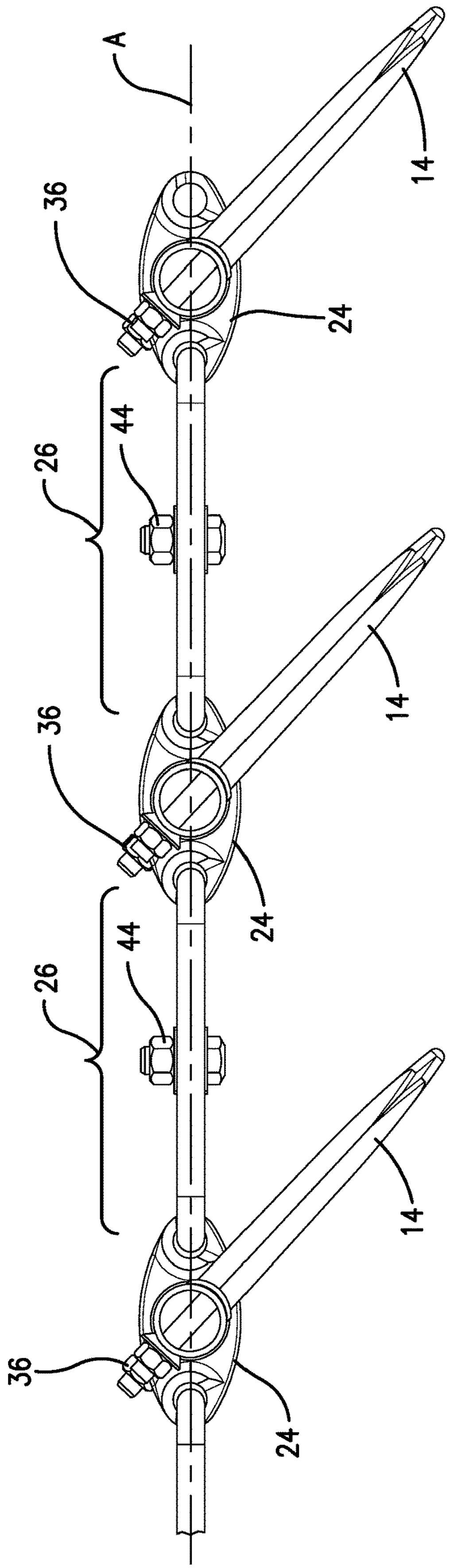
FIG. 7 provides a side view of the harrow implement from FIG. 6, with linkage assemblies of the harrow implement laying horizontally.
Figure 8:
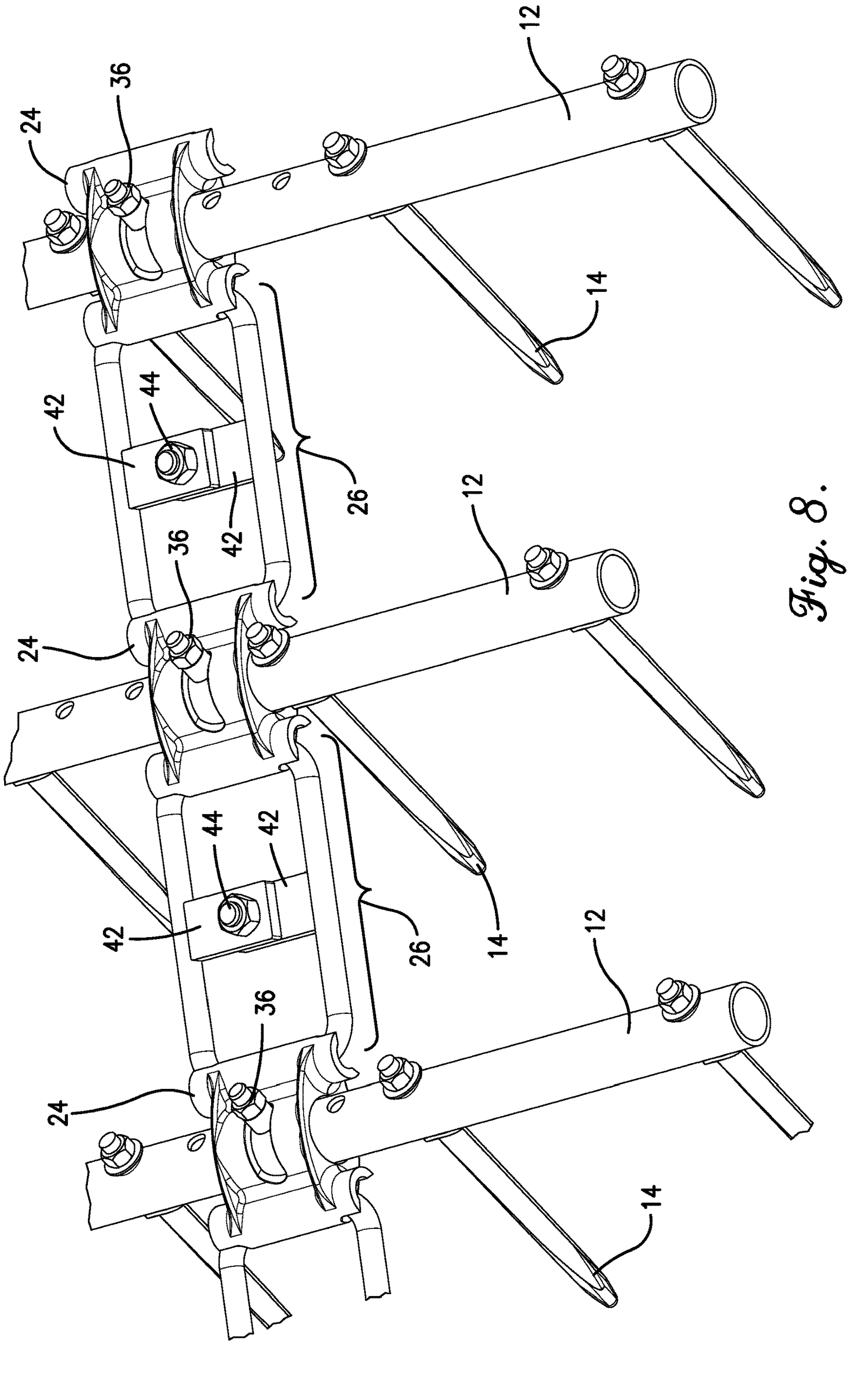
FIG. 8 provides a top view of the harrow implement from FIG. 6, with the pin of the support bar shifted rearward in the notch of the base element.
Figure 9:
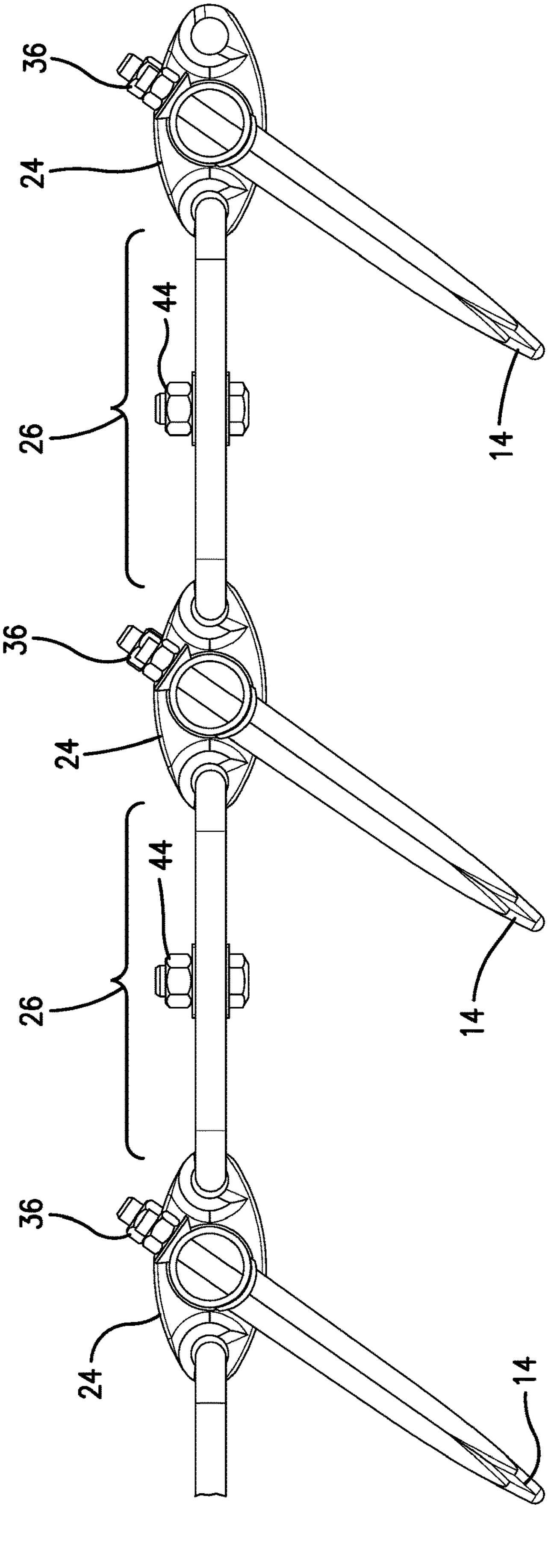
FIG. 9 provides a side view of the of the harrow implement from FIG. 8, with the linkage assemblies laying horizontally.

As noted in FIGS. 5A and 5B, each of the base elements 24 may comprise an upper portion having a longitudinally extending slot 30 that extends through a thickness of the upper portion of the base element. Correspondingly, as shown in FIGS. 4 and 6-9, the associated support bar 12 includes a guide pin 36 configured to extend through the slot 30. The slot 30 generally extends in a longitudinal direction (front to back) from a vertical position to a front stop and a back stop. The front stop may be at an angular distance from 40 and 60 degrees, from 45 to 55 degrees, or about 50 degrees from the vertical position. The back stop may be at an angular distance from 30 and 50 degrees, from 35 to 45 degrees, or about 38 degrees from the vertical position. As such, and as shown in FIGS. 4, 6, and 7, during operation of the harrow implement (i.e., when the tractor is pulling the harrow implement from a front end), the guide pin 36 is caused to be abutted against the front stop of the slot 30, such that the support bars 12 are rotated so that the teeth 14 extend downward from the support bars 12 at an angle of attack of from 40 and 60 degrees, from 45 to 55 degrees, or about 50 degrees from vertical (in a rearward direction). Such an angle of the teeth 14 may be referred to as a "shallow" angle of attack. In contrast, and as shown in FIGS. 8 and 9, during an alternative operation of the harrow implement (i.e., when the tractor is pulling the harrow implement from a rear end), the guide pin 36 is caused to be abutted against the back stop of the slot 30, such that the support bars 12 are rotated so that the teeth 14 extend downward from the support bars 12 at an angle of attack of from 30 and 50 degrees, from 35 to 45 degrees, or about 38 degrees from vertical (in a rearward direction). Such an angle of the teeth 14 may be referred to as a "steep" angle of attack.

Turning again to FIG. 4, the linking elements 26 may comprise two halves that are generally separated/split along a longitudinal direction (e.g., front to back). As such, each half is formed in a "C shape" with a pair of laterally extending insert elements 38 interconnected by a longitudinally extending connection element 40. In addition, as shown in FIGS. 4, 6, and 8, each half may include a coupling tab 42 extending laterally from the connection element 40 between the pair of insert elements 38. As such, the two halves can be secured together via a fastener 44 extending through the coupling tabs 42 of the two halves.

As noted above, the base element 24 may comprise a pair of receiving tubes 32 extending laterally through forward and rearward ends of the base element 24. As such, the linking element 26 can be engaged with a base element 24 by one of the insert elements 38 of each half of the linking element 26 being received within one of the receiving tubes 32 of the base element 24. The receiving tube 32 may be formed with a notch 34 providing a stop surface for the linking element 26. As such, the stop surface prevents the linking element 26 from rotating beyond a generally horizontal orientation during operation of the harrow implement 10.

Figure 10A:
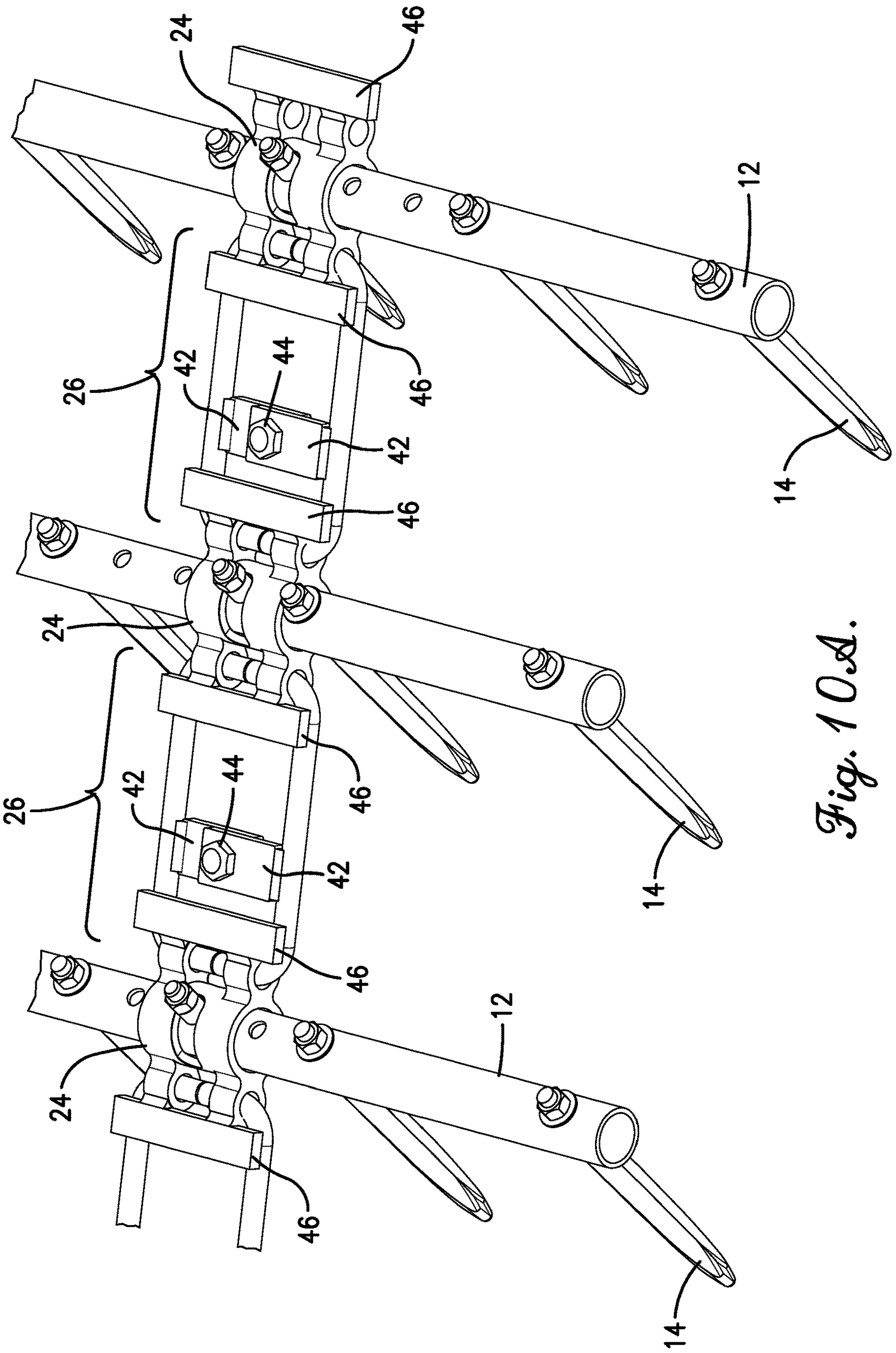
FIG. 10A provides a top view of a portion of a harrow implement with linkage assemblies with flat bar stops according to other embodiments of the present invention.
Figure 10B:
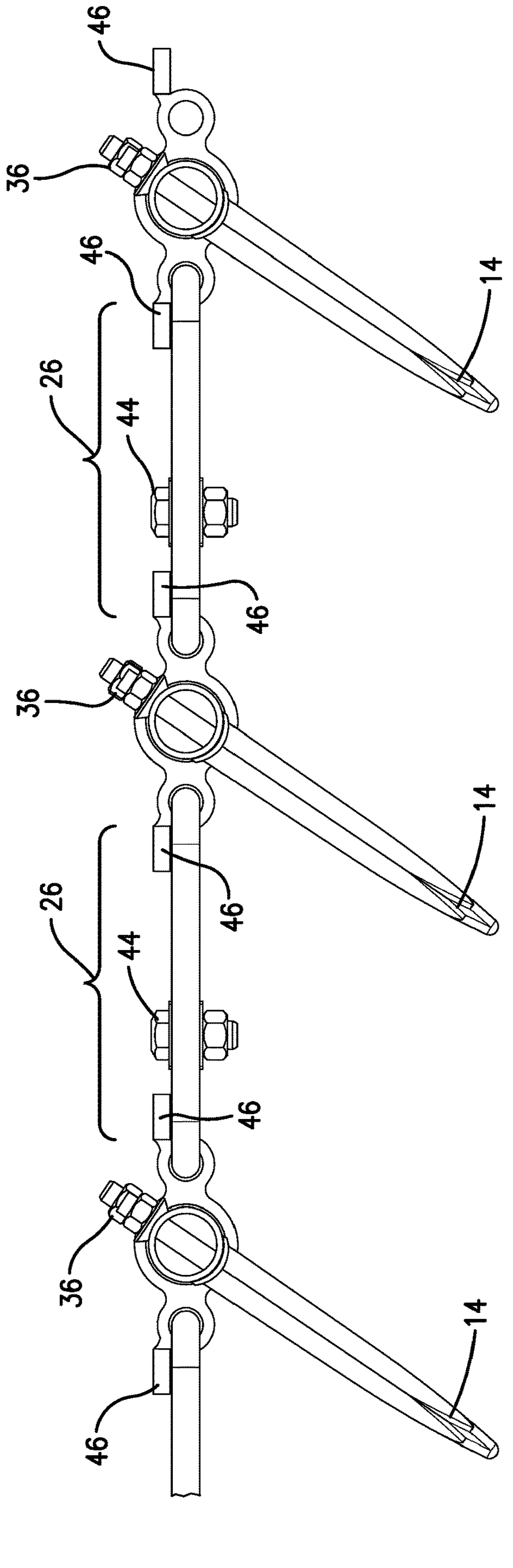
FIG. 10B provides a side view of the harrow implement from FIG. 10A.

In some alternative embodiments, and as depicted in FIGS. 10A and 10B, the base element 24 may include a pair of stop tabs 46 extending forward and rearward from the each of the receiving tubes 32 of the central section of the base element 24. In such embodiments, the stop tabs 46 present a stop surface preventing the linking elements 26 from rotating beyond the generally horizontal orientation.

In view of the above, the linkage assemblies 16 of embodiments of the present invention permit an associated harrow implement to operate such that all of the teeth are held in the appropriate orientation (i.e., the appropriate attack angle) during operation. In more detail, a harrow implement 10 can be coupled to a tractor, with the harrow implement 10 comprising a plurality of support bars 12 extending laterally across a width of the harrow implement 10, and with the support bars 12 being held spaced apart from one another by a plurality of linkage assemblies 16 (as described above) that connect adjacent support bars 12. As such, each of the support bars 12 will include a plurality of teeth 14 extending in a generally downward direction from the support bars 12 for engagement with the ground/soil.

Next, the tractor 18 will pull the harrow implement 10 through a field. Beneficially, due to the configuration of the linkage assemblies 16, during operation (i.e., during the pulling of the harrow implement 10), the linkage assemblies 16 (and particularly an imaginary plane, e.g., Plane A of FIG. 7, extending longitudinally through and/or co-planar or parallel with the linking elements 26 of the linkage assemblies 16) are configured to be maintained in a generally horizontal orientation. As such, each of the linking elements 26 of the linkage assemblies 16 will have their orientations aligned, such that, in some embodiments, a horizontal plane, e.g., Plane A of FIG. 7, will encompass all of the linking elements 26 of a given harrow implement 10. In some embodiments, the linkage assemblies 16 (and particularly the linking elements 26) will not rotate more than 15 degrees, more than 10 degrees more, more than 5 degrees, and/or more than 3 degrees from a horizontal orientation during operation of the tillage implement 10.

By maintaining the linking elements 26 of the linkage assemblies 16 in such consistent orientations, the support bars 12 and associated teeth 25 may also be maintained in proper orientations. Specifically, when pulling the harrow implement 10 from a forward end, the teeth 14 of the harrow implement 10 may extend from the support bars 12 at an angle of attack of from 40 and 60 degrees, from 45 to 55 degrees, or about 50 degrees from vertical (i.e., a shallow angle of attack). When pulling the harrow implement 10 from a rearward end, the teeth 14 may extend from the support bars 25 at an angle of attack of from 30 and 50 degrees, from 35 to 45 degrees, or about 38 degrees from vertical (i.e., a steep angle of attack). In some embodiments, the teeth 14 may not deviate from the intended angle of attack by more than 15 degrees, more than 10 degrees more, more than 5 degrees, and/or more than 3 degrees.

Figure 11A:
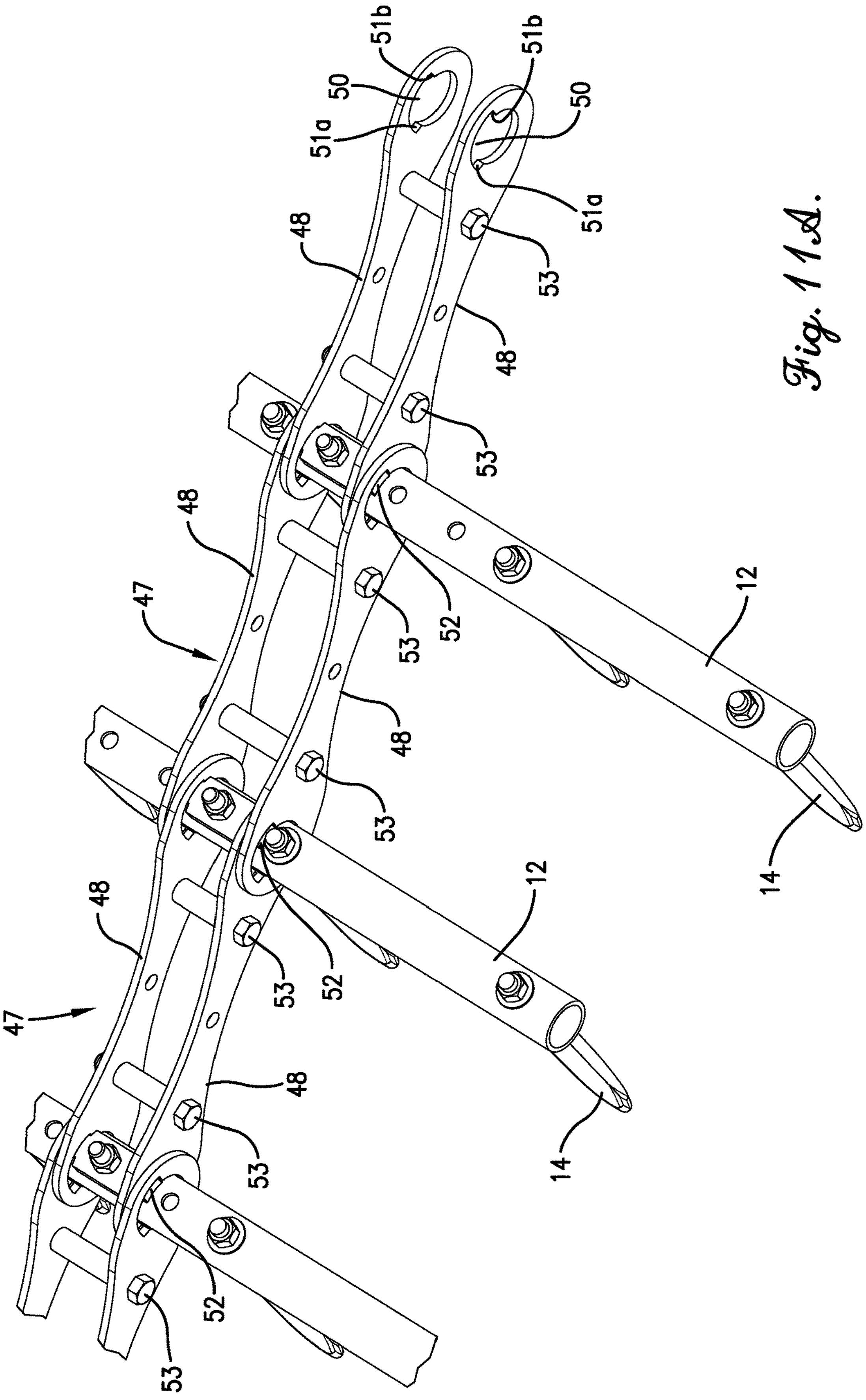
FIG. 11A provides a top view of a portion of a harrow implement with linkage assemblies with bicycle chain-type linkages according to other embodiments of the present invention.
Figure 11B:
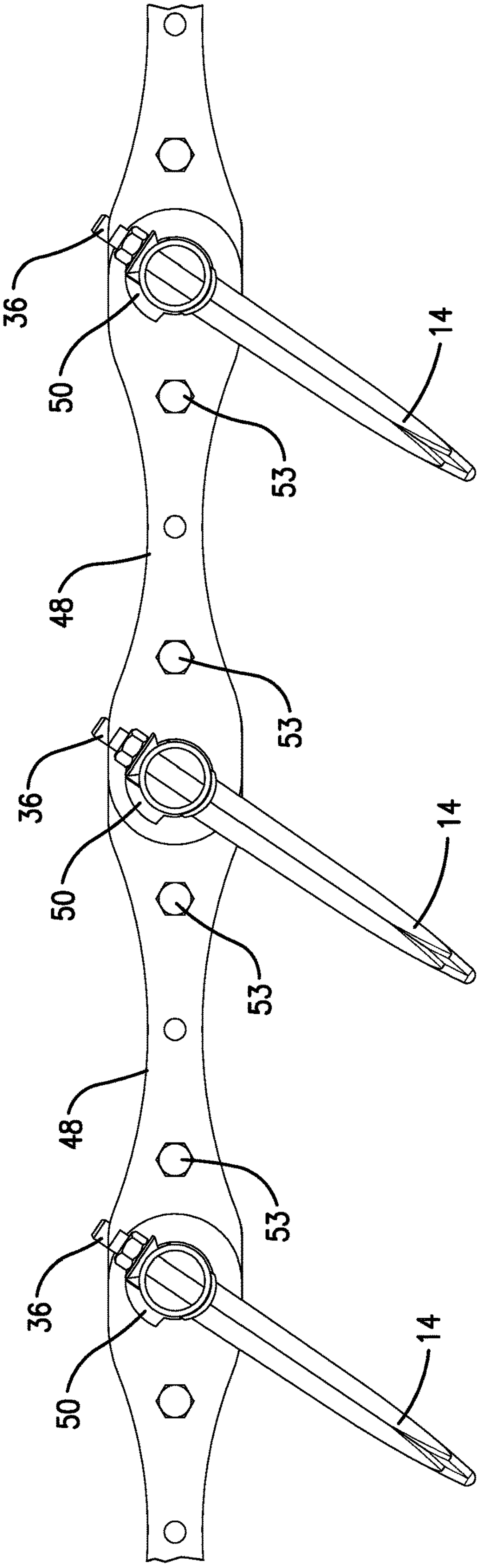
FIG. 11B provides a side view of the harrow implement from FIG. 11A.

It should be understood that other styles of linkage assemblies may be used to operably couple the support bars 12 of harrow implements 10, such as roller chain-style linkage assemblies. These roller chain-style linkage assemblies 47 are depicted in FIGS. 11A and 11B. As shown in FIGS. 11A and 11B, the linkage assemblies 47 may be in the form of a roller chain design that contains roller chain linkages 48 that extend between each of the support bars 12. The ends of the linkages 48 include through-holes 50 formed with notches 51*a*, 51*b* that act as front and back stops for tabs 52 formed on the support bars 12. In more detail, the through-holes 50 are configured to receive the support bars 12. The through-holes 50 also provide the notches 51*a*, 51*b* to act as stops to engage with the tabs 51 of the support bars 12 as the support bars rotate to maximum forward or rearward positions. As such, the engagement between the notches 51*a*, 51*b* and the tabs 52 function to keep the support bars 12, and the teeth 14 extending therefrom, in the proper orientation. In FIGS. 11A and 11B, the linkage assemblies 47 can comprise two parallel-spaced chain linkages 48 held together by fasteners 53.

Furthermore, the components described herein may be formed from various materials having sufficient strength and durability, such as steel, iron, etc. Similarly, various methods of manufacture may be used, such as casting, welding, traditional fasteners, etc.

Definitions

It should be understood that the following is not intended to be an exclusive list of defined terms. Other definitions may be provided in the foregoing description, such as, for example, when accompanying the use of a defined term in context.

As used herein, the terms "a," "an," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination, B and C in combination; or A, B, and C in combination.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "having," "has," and "have" have the same open-ended meaning as "comprising," "comprises," and "comprise" provided above.

As used herein, the terms "including," "include," and "included" have the same open-ended meaning as "comprising," "comprises," and "comprise" provided above.

Claims not Limited to Disclosed Embodiments

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as it pertains to any apparatus not materially departing from but outside the literal scope of the invention as set forth in the following claims.

What is claimed is:

1. A harrow implement configured to be pulled by a tractor, the harrow implement comprising:

a plurality of support bars extending laterally across a width of the harrow implement, wherein the support bars are spaced apart from one another, and wherein the support bars include a plurality of teeth extending in a generally downward direction from the support bars; and a plurality of linkage assemblies connecting adjacent support bars, wherein the linkage assemblies are configured to be maintained in a generally horizontal orientation as the tractor pulls the harrow implement, wherein each linkage assembly of the plurality of linkage assemblies comprises a base element and a linking element, wherein the base element presents a laterally-extending through-hole through which a respective support bar of the plurality of support bars extends, and wherein the base element further comprises a longitudinally extending slot, wherein each of the support bars of the plurality of support bars includes a guide pin extending through a slot of a base of a respective linkage assembly of the plurality of linkage assemblies, wherein the guide pins of the support bars are configured to actuate within respective slots, thereby allowing the support bars to rotate such that the plurality of teeth can be (i) oriented at a shallow angle of attack when the harrow implement is pulled from a first end, and (ii) oriented at a steep angle of attack when the harrow implement is pulled from an opposite, second end.

2. The harrow implement according to claim 1, wherein the plurality of linkage assemblies are configured to not rotate more than 15 degrees from a horizontal orientation.

3. The harrow implement according to claim 1, wherein the base element of each linkage assembly is engaged with a respective support bar and the linking element of the linkage assembly extends from the base element towards an adjacent support bar.

4. The harrow implement according to claim 1, wherein the linking element of each linkage assembly extends between the base element of the respective linkage assembly and a second base element.

5. The harrow implement according to claim 1, wherein the linking element of each linkage assembly comprises two halves, and wherein the two halves are split along a longitudinal direction of the linking element.

6. The harrow implement according to claim 1, wherein the base element of each linkage assembly comprises a central section and a pair of receiving tubes extending laterally through forward and rearward ends of the base element, wherein the linking element of the respective linkage assembly is engaged with the base element via one of the receiving tubes of the base element.

7. The harrow implement according to claim 1, wherein the harrow implement is supported on an implement frame.

8. A method of using an agricultural harrow implement, the method comprising the steps of:

(a) coupling the harrow implement to a tractor, wherein the harrow implement comprises a plurality of support bars extending laterally across a width of the harrow implement, wherein the support bars are held spaced apart from one another by a plurality of linkage assemblies connecting adjacent support bars, and wherein the support bars include a plurality of teeth extending in a generally downward direction from the support bars, wherein each linkage assembly of the plurality of linkage assemblies comprises a base element that includes a laterally-extending through-hole through which a respective support bar of the plurality of support bars extends, and wherein the base element further comprises a longitudinally extending slot, wherein each of the support bars of the plurality of support bars includes a guide pin extending through a slot of a base of a respective linkage assembly of the plurality of linkage assemblies;

(b) pulling the harrow implement, via a first end of the harrow implement, through a field, wherein during the pulling of step (b), the linkage assemblies are maintained in a generally horizontal orientation, and the guide pins of the support bars are actuated within respective slots such that the support bars rotate and the plurality of teeth are oriented at a shallow angle of attack; and (c) pulling the harrow implement, via an opposite, second end of the harrow implement, through the field, wherein during the pulling of step (c), the linkage assemblies are maintained in a generally horizontal orientation, and the guide pins of the support bars are actuated within respective slots such that the support bars rotate and the plurality of teeth are oriented at a steep angle of attack.

9. The method according to claim 8, wherein, during the pulling of step (b), the plurality of linkage assemblies are configured to not rotate more than 15 degrees from a horizontal orientation.

10. The method according to claim 8, wherein the base element of each linkage assembly is engaged with a respective support bar and the linking element of the linkage assembly extends from the base element towards an adjacent support bar.

11. The method according to claim 8, wherein the linking element of each linkage assembly extends between the base element of the respective linkage assembly and a second base element.

12. The method according to claim 8, wherein the linking element of each linkage assembly comprises two halves and wherein the two halves are split along a longitudinal direction of the linking element.

13. The method according to claim 8, wherein the base element of each linkage assembly comprises a central section and a pair of receiving tubes extending laterally through forward and rearward ends of the base element, wherein the linking element of the respective linkage assembly is engaged with the base element via one of the receiving tubes of the base element.

14. A method of using an agricultural harrow implement, the method comprising the steps of:

(a) coupling the harrow implement to a tractor, wherein the harrow implement comprises a plurality of support bars extending laterally across a width of the harrow implement, wherein the support bars are held spaced apart from one another by a plurality of linkage assemblies connecting adjacent support bars, and wherein the support bars include a plurality of teeth extending in a generally downward direction from the support bars, wherein each linkage assembly of the plurality of linkage assemblies comprises a base element that includes a laterally-extending through-hole through which a respective support bar of the plurality of support bars extends, and wherein the base element further comprises a longitudinally extending slot, wherein each of the support bars of the plurality of support bars includes a guide pin extending through a slot of a base of a respective linkage assembly of the plurality of linkage assemblies;

(b) pulling the harrow implement, via the tractor, from a front end of the harrow implement, wherein during the pulling of step (b) the guide pins of the support bars are actuated within respective slots such that the support bars rotate and the teeth are oriented at a first angle of attack; and (c) pulling the harrow implement, via the tractor, from a rear end of the harrow implement, wherein during said pulling of step (c) the guide pins of the support bars are actuated within respective slots such that the support bars rotate and the teeth are oriented at a second angle of attack, wherein the second angle of attack is different from the first angle of attack, wherein during said pulling of steps (b) and (c), the linkage assemblies are maintained in a generally horizontal orientation.

* * * * *